April 19, 1932. L. R. KEOGH 1,854,409
PROCESS FOR THE PRODUCTION OF ALUMINA, SODA, AND HYDROCHLORIC ACID
Filed June 10, 1927 4 Sheets-Sheet 1
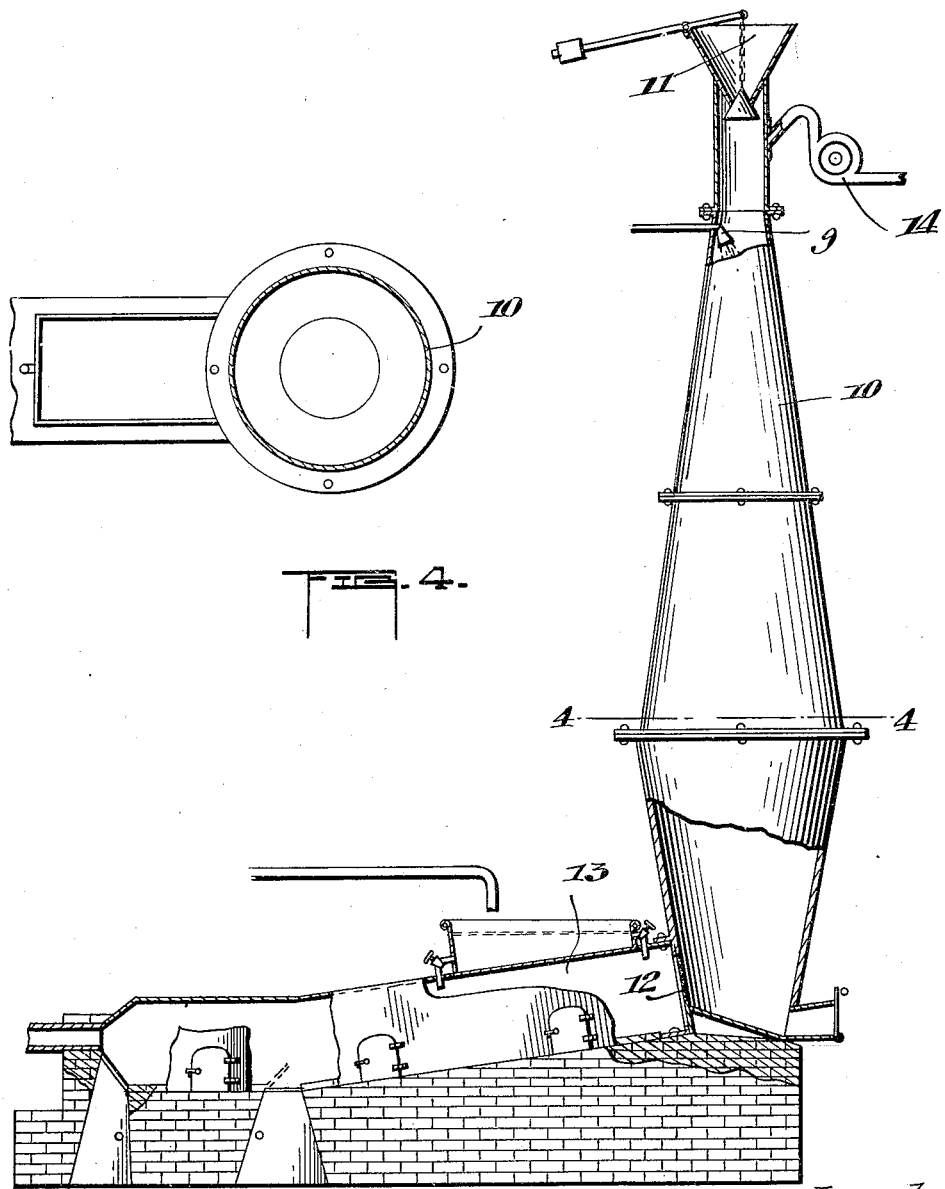
Inventor:
Licius Richard Keogh, Deceased
by Noah Joseph Gareau, Administrator.
By Johnstonhaugh & Co

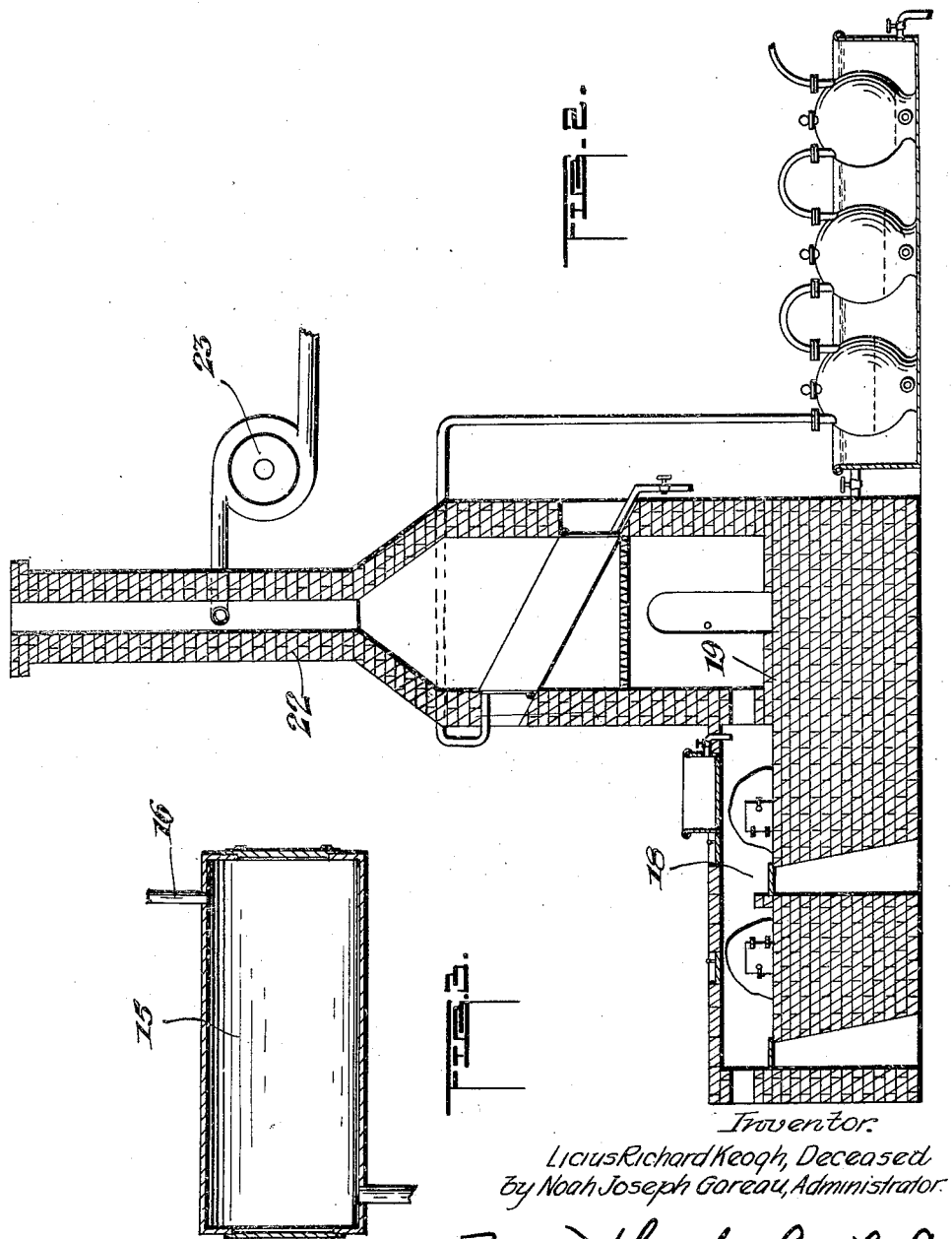

April 19, 1932.  L. R. KEOGH  1,854,409
PROCESS FOR THE PRODUCTION OF ALUMINA, SODA, AND HYDROCHLORIC ACID
Filed June 10, 1927   4 Sheets-Sheet 3
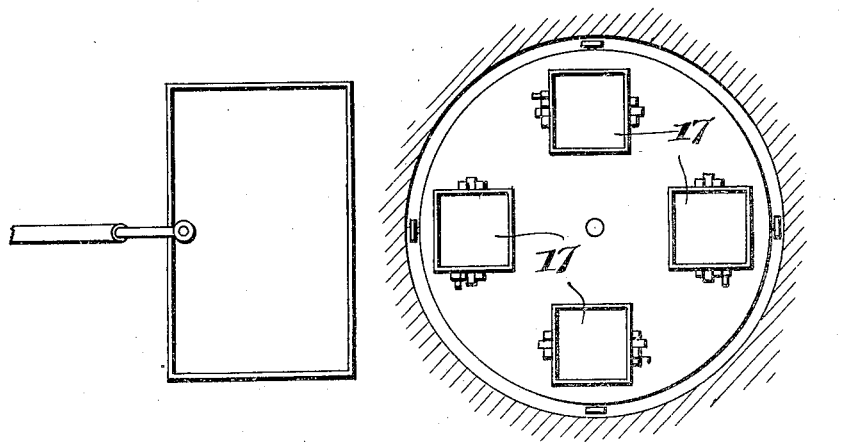
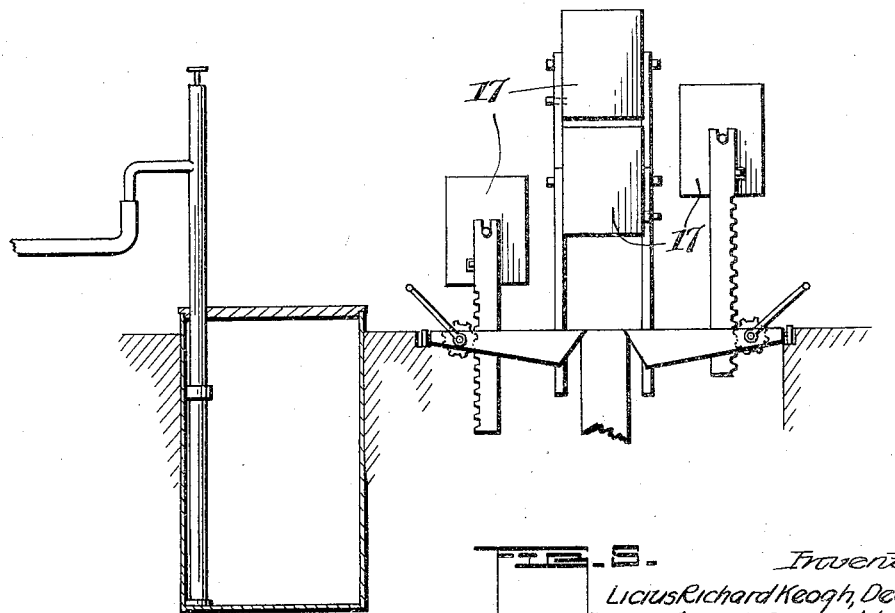
Inventor
Licius Richard Keogh, Deceased
by Noah Joseph Gareau, Administrator
By Fetherstonhaugh & Co April 19, 1932.    L. R. KEOGH    1,854,409
PROCESS FOR THE PRODUCTION OF ALUMINA, SODA, AND HYDROCHLORIC ACID
Filed June 10, 1927    4 Sheets-Sheet 4
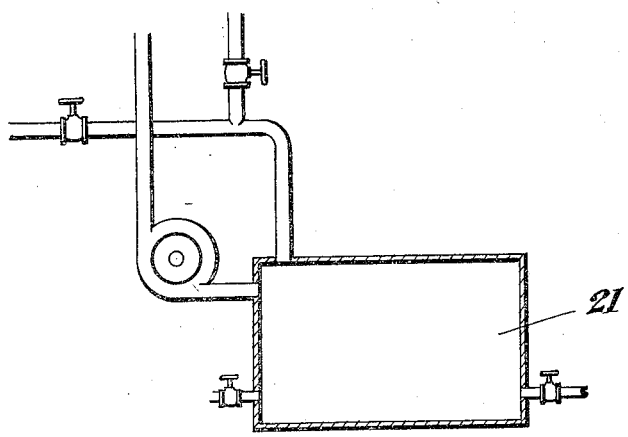
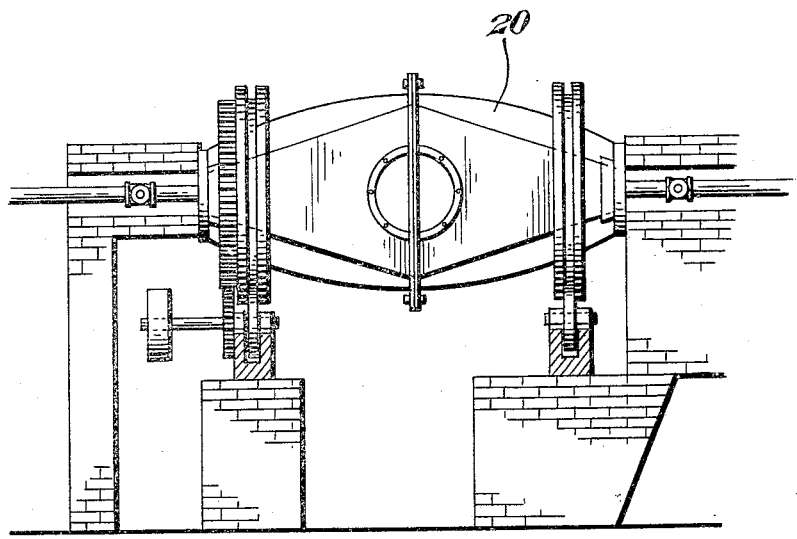
Inventor.
Licius Richard Keogh, Deceased
by Noah Joseph Gareau, Administrator.
By Fetherstonhaugh & Co Patented Apr. 19, 1932

1,854,409

UNITED STATES PATENT OFFICE

LUCIUS RICHARD KEOGH, DECEASED, LATE OF OTTAWA, ONTARIO, CANADA, BY NOAH JOSEPH GAREAU, ADMINISTRATOR, OF OTTAWA, ONTARIO, CANADA, ASSIGNOR TO SODA ALUMINA CHEMICAL COMPANY, OF OTTAWA, ONTARIO, CANADA

PROCESS FOR THE PRODUCTION OF ALUMINA, SODA, AND HYDROCHLORIC ACID

Application filed June 10, 1927, Serial No. 197,964, and in Canada September 30, 1926.

This invention relates to a new and improved process for the production of alumina, soda and hydrochloric acid and the object of the invention is to provide a more satisfactory and economical process for the commercial production of alumina, soda and hydrochloric acid and is in part an improvement over United States Patents 744,765, 794,413, 996,094.

The process relates to the production and reduction of aluminium sulphide, thus yielding a metallic aluminium with the expenditure of very much less power than what is at present required for the reduction of the oxide.

The process consists in first calcining clay which is made into briquets. These briquets are introduced at regular intervals into a specially constructed tower and the finished briquets are removed at regular intervals. A spray of cool water constantly plays upon the charge of clay and from below hot steam, air, sulphur trioxide, sulphur dioxide and nitric oxide with other furnace gases. This treatment results in heavily charging the briquets with aluminium sulphate and silica which is dehydrated. The briquets remain in the tower for a period of three or four days to complete the action and are leached in water containing sulphuric acid producing a highly concentrated solution of aluminium sulphate. This solution is run onto the hot hearth of a furnace where it is first dehydrated and subsequently partially dissociated to produce a substance referred to in the following formula $Al_2O_3.SO_3$. This operation produces $SO_2$. The $Al_2O_3.SO_3$ is a dry, porous, friable somewhat hygroscopic mass, easily handled and easily made into briquets. This is mixed with sodium chloride, coal and a small quantity of water and moulded into briquets which are charged into an iron cylinder kept at 300° C. and treated from below by steam which produces hydrochloric acid according to the following equation:—

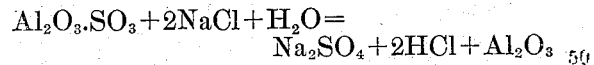
$$Al_2O_3.SO_3 + 2NaCl + H_2O = Na_2SO_4 + 2HCl + Al_2O_3$$

The step as above described whereby hydrochloric acid is disengaged is not only novel but most important.

The briquets which now consist mainly of $Al_2O_3$ and some sodium sulphate and coal are charged into a rotary balling furnace where they are heated to a red heat. The carbon present reduces the sodium sulphate to sodium sulphide according to the following equation:—

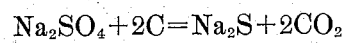
$$Na_2SO_4 + 2C = Na_2S + 2CO_2$$

This is also a most important step as well as the one which follows it.

The briquets remain in the furnace for further treatment. They are then heated to a higher temperature with super heated steam which produces sodium aluminate according to the following equation:—

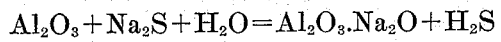
$$Al_2O_3 + Na_2S + H_2O = Al_2O_3.Na_2O + H_2S$$

The fused mass of sodium aluminate is leached to form a solution of aluminate of soda and aluminium hydroxide is recovered by treatment with carbon dioxide according to the following equation:—

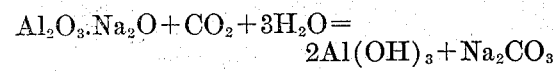
$$Al_2O_3.Na_2O + CO_2 + 3H_2O = 2Al(OH)_3 + Na_2CO_3$$

The aluminium hydroxide is calcined to produce pure alumina.

For the purpose of the process certain apparatus are used which may be of any convenient construction and in the present instance are as disclosed in the accompanying drawings in which like numerals of reference indicate corresponding parts in each figure and in which, Figure 1 is a side elevation partly in section of a furnace and specially constructed tower, Figure 2 is a side elevation of a furnace also provided with a tower of ordinary construction communicating with a series of condensers.

Figure 3 is a longitudinal section of the iron cylinder.

Figure 4 is a section on the line 3—3 of Figure 1.

Figure 5 is a side elevation partly in section of the leaching tanks and settling tank.

Figure 6 is a top plan view of same.

Figure 7 is a front elevation of a rotary balling furnace.

Figure 8 is a section in detail through the scrubber and the pipes communicating with it.

In carrying out this process the following materials are used:—Clay as low as possible in magnesia and preferably low in lime and iron; pure salt; coal dust or small coal or some equivalent form of carbon, the purer the better; sulphur trioxide recovered in the process and used over again, with some sulphur dioxide and nitric oxide sufficient to convert this latter to sulphur trioxide; water; steam; air; carbon dioxide produced in the process.

The principal reactions and steps of the process are as follows:—

The clay is formed into briquets and dried. It is then calcined gently or slowly to incipient redness, to remove a portion of the water leaving the clay sufficiently hard to prevent crushing under its own weight when charged into the tower. It is also porous so that it readily absorbs water and acid in large quantities.

This calcined clay is treated with sulphuric acid so as to form a solution of impure sulphate of alumina. The reaction may be represented thus:—

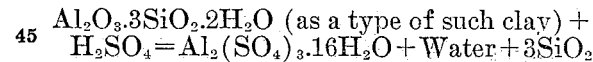
$Al_2O_3.3SiO_2.2H_2O$ (as a type of such clay) $+ H_2SO_4 = Al_2(SO_4)_3.16H_2O + Water + 3SiO_2$ There will also be formed here impurities such as sulphate of lime, magnesium and iron of various kinds, ferrous and ferric, normal and basic, &c. If the conditions are right, however, the silica is dehydrated by the action of heat, of $H_2SO_4$, of $SO_3$ (and possibly of aluminium sulphate to some extent).

This treatment of the clay can be accomplished in various ways by pulverizing the clay and boiling it with dilute sulphuric acid in excess and concentrating to sulphuric acid.

The briquets formed after calcination are charged in quantities, preferably three or four days run so as to secure complete and perfect action, into a specially constructed tower, indicated by the numeral 10 in Figure 1 of the drawings, provided with an opening 11 into which new briquets are introduced at regular intervals, while from below are removed at regular intervals the briquets that have been sufficiently treated. At the top of the tower a spray 9 of cold water constantly plays upon the charge of briquetted clay and from below through the grating 12 are constantly introduced the hot steam, air, sulphur trioxide, sulphur dioxide and nitric acid with more or less furnace gases from the furnace 13 all mixed together as they are formed or recovered in the furnace. These gases are drawn up through the tower by an exhauster 14. The acids of sulphur and of nitrogen are absorbed by the water and by the clay while most of the carbon dioxide and nitrogen passes out through the exhauster. The action in this tower presents a series of stages as follows:—

At the top the cold water absorbs practically all the acids of sulphur and of nitrogen not taken up below, and the solution is absorbed by the clay. The solution is concentrated and heated as the mass descends in the tower. The sulphuric acid acts upon the clay; the nitric oxide is released for further action; the steam rises and is condensed above. The increasing heat causes the sulphuric acid, which is always in excess and is accompanied by steam, to decompose the clay very extensively. Still further down the heat and free $SO_3$ and excess $H_2SO_4$ dehydrate the silica, and at the base of the tower the heat is so regulated as to accomplish this but not to decompose the sulphate of alumina formed and the briquets are removed at the base of the tower charged heavily with sulphates, but with the silica dehydrated. By carefully regulating the furnaces the spray of water, and the air drafts and the action of the exhauster, and by regulating the charges of briquets, the action in this tower can be very well controlled.

The briquets remain in the tower three or four days and the action upon them is very complete. They are then leached in hot water containing sulphuric acid which ensures the solution of dehydrated or of basic sulphates of aluminium if present. This solution is concentrated by passing through a series of leaching tanks 17, see Figures 5 and 6, in the last of which fresh briquets are always maintained, while the fresh hot acidulated water is always applied to the tank containing the leached residues. This concentration, and subsequent concentration by waste heat of the furnaces excludes from the solution much of the sulphate of lime, if any is formed in the action. A highly concentrated solution of aluminium sulphate is thus constantly obtained, which will contain sulphates of iron and probably of magnesia more or less according to the clay used).

This highly concentrated solution is next run in a small steady stream in upon the hot hearth 18 of a furnace 19 where it is first dehydrated and subsequently partly dissociated as follows:—

(1) $Al_2(SO_4)_3.16H_2O = Al_2(SO_4)_3 + 16H_2O$ (2) $Al_2(SO_4)_3 = Al_2O_3.SO_3 + 2SO_3$

This steam and sulphur trioxide with the furnace gases pass on up the tower as above described where they are recovered and used over again. Thus practically two-thirds of the sulphur is recovered readily, easily, and without any special plant or treatment. It is recovered as $SO_3$ and not as $SO_2$ a very important point. The action is complete at incipient redness, the aluminium sulphate being obtained as $Al_2O_3.SO_3$ a dry, porous, friable somewhat hygroscopic mass, easily handled, easily ground and easily made into briquets as required in the next stage.

The sulphates of lime, if any, and the magnesia sulphate remain unchanged at this stage, but the sulphates of iron undergo changes analogous to those of the aluminium sulphate.

The porous mass of $Al_2O_3.SO_3$ is now removed from the furnace and ground up intimately with sodium chloride and small coal in proper proportions; the finely powdered mass is now mixed with enough water to make it plastic and is moulded into briquets which soon dry hard and form by the hygroscopic action of the $Al_2O_3.SO_3$. These briquets are now ready for further treatment.

They are charged into closed iron cylinders 15 kept at a temperature of about 300° C. and are treated from below by steam which readily disengages hydrochloric acid according to the reactions:—

$Al_2O_3.SO_3 + 2NaCl + H_2O = Na_2SO_4 + 2HCl + Al_2O_3$

The iron sulphates undergo analogous decomposition to that of the $Al_2O_3.SO_3$. The carbon remains inactive, the lime and magnesia sulphates remain unchanged.

The acid is removed through a pipe 16 and condensed. The briquets shrink, but remain firm, well knit, and fairly porous. They will bear handling very well.

These briquets now consist of $Al_2O_3$, small coal, $Fe_2O_3$ &c., &c. and $Na_2SO_4$.

They are charged into a rotary balling furnace 20 where they are heated to a red heat. The carbon now reduces the $Na_2SO_4$ according to Leblanc's reaction:—

$Na_2SO_4 + 2C = Na_2S + 2CO_2$

The $Fe_2O_3$ is reduced to Fe and CO and the $CaSO_4$, if any, to CaS. The magnesia sulphate is not reduced to any great extent. The carbon dioxide passes with the furnace gases over the hearth and up the tower aforesaid. This gas is subsequently drawn by the exhauster above mentioned through the tower and is finally used to precipitate the alumina to form sodium carbonate in solution as set forth below.

The briquets now remain in the balling furnace for further treatment.

These briquets are now heated to a high temperature, and superheated steam at ordinary pressure is introduced through the charge in small quantity. There results a marked action as follows:—

$Al_2O_3 + Na_2S + H_2O = Al_2O_3.Na_2O + H_2S$

Sodium aluminate is formed, and hydrogen sulphide is evolved. This latter burns to $SO_2$ and $H_2O$ and steam so formed pass with the furnace gases up the tower. Thus the balance of the sulphur (practically one-third) is recovered from pots connected with the furnace and with steam and air, and so it is transformed into $SO_3$ and is then recovered and used over again in the tower to form sulphate of aluminium &c.

Thus almost all of the sulphur is recovered and used over again without any special treatment of residues, and without the need of any sulphuric acid plant.

The metallic iron produced by the carbon first forms black sulphide with the $H_2S$ but this is subsequently oxidized to $Fe_2O_3$ and $SO_2$ and the latter passes to the tower 10.

There remains in the furnace a fused mass of sodium aluminate containing impurities, e. g. $Fe_2O_3$, some ash, some coal, some CaS and some $MgSO_4$ (if present). This mass is removed, cooled and leached, when the aluminate (and magnesia sulphate if any) pass into solution. The CaS, $Fe_2O_3$, coal and ash remain undissolved. The aluminate of soda and magnesia sulphate in solution immediately react, forming sulphate of soda and insoluble magnesium aluminate, and thus the magnesia is also removed and a pure solution of soda is obtained. It is decanted, concentrated and precipitated as shown in H.

H. The solution of sodium aluminate is now treated with carbon dioxide from the tower and exhauster above mentioned after it has been scrubbed in the scrubber 21 to remove any $SO_2$ &c. from it and the alumina is thus precipitated and the soda formed in solution as follows:—

$Al_2O_3.Na_2O + CO_2 + 3H_2O = 2Al(OH)_3 + Na_2CO_3$

The alumina is recovered and washed by decantation. It is then ready for calcination for reduction to metal by Hall's electrolytic process, or it can be sold or used for the production of pure sulphate of alumina &c., &c. The pure sulphate of alumina is the material employed in the sulphide process.

The solution of soda is concentrated and recovered in the usual way.

Thus the process is complete and it is continuous. The minute description of the process appears complicated but in practice it is not so, as most of the actions take care of themselves with a little careful rule of thumb work on the part of the operators. The process can easily be kept check on by a competent chemist.

From the foregoing it will be seen that following the charging of the tower with briquets of calcined clay treated with sulphuric acid and the subsequent leaching of the briquets in sulphuric acid producing a highly concentrated solution of aluminum sulphate from which, on being run onto the hot hearth of a furnace, a dry, porous, friable, somewhat hygroscopic mass represented by the equation $Al_2O_3.SO_3$ is obtained, which on removal from the furnace is ground and mixed with sodium chloride and small coal and formed into briquets by the addition of water. These briquets are then charged into closed iron cylinders 15 at a temperature of 300° C. and treated from below by steam which separates the hydrochloric acid which in turn is removed from the cylinder through a pipe 16. The hydrochloric acid having been removed, the briquets are then charged into a rotary balling furnace 20 and heated to a red heat to reduce the carbon. The briquets are then heated to a high temperature and super heated steam at ordinary pressure introduced through the charge in small quantity forming sodium aluminate and evolving hydrogen sulphide which burns to $SO_2$ and $H_2O$ and steam so passing with the furnace gases up the tower 22, see Figure 2.

Thus the balance of the sulphur, as previously mentioned is recovered as $SO_2$ by mixing on its way with the oxides of nitrogen from nitre-pots (not shown) connected with a furnace and with steam and air and is transformed into $SO_3$ and is then recovered and used over again in the tower to form sulphate of aluminum.

There remains in the furnace a fused mass of sodum aluminate which is removed, cooled and leached to form a solution of sodium aluminate, and aluminum hydroxide is recovered by treatment with carbon dioxide according to the following equation:—

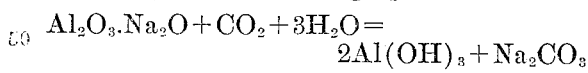

$$Al_2O_3.Na_2O + CO_2 + 3H_2O = 2Al(OH)_3 + Na_2CO_3$$

The aluminum hydroxide is then calcined to produce pure alumina.

As many changes could be made in the above process and many apparently widely different embodiments of the invention, within the scope of the claims, set forth without departing from the spirit or scope thereof, it is intended that all matter contained in the accompanying specification and drawings shall be interpreted as illustrative and not in a limiting sense.

What is claimed is:—

1. A process for the manufacture of alumina, sodium carbonate and hydrochloric acid from clay, which consists in pulverizing and calcining the clay at a temperature of approximately 700 degrees C. and then briquetting it, subjecting the calcined briquettes of the clay in a tower to a down flow of cold water and an upstream of gases containing oxides of nitrogen and sulphur to produce a highly concentrated solution containing aluminium sulphate, passing such solution on to the hot hearth of a furnace to be first dehydrated and subsequently partially dissociated to produce a dry porous friable easily briquetted mass of aluminium sulphate, while permitting the evolved steam and the sulphur trioxide to mingle with the furnace gases in the tower for use again, then briquetting the porous mass of aluminium sulphate with coal and sodium chloride, heating it to a temperature of approximately 300 degrees C. with access of steam from below to evolve gaseous hydrochloric acid, further heating the residue beyond the stage at which hydrochloric acid is evolved to convert the sodium sulphate whereby carbon dioxide is evolved and conducting the carbon dioxide up the tower again heating the briquettes to a temperature of about 900 degrees C. and introducing superheated steam to form sodium aluminate and evolve hydrogen sulphide, burning the hydrogen sulphide to sulphur dioxide and completing the combustion to sulphuric acid to be returned for the briquettes of the calcined clay, removing the residue of sodium aluminate with impurities, cooling and leaching the same in solution to form a pure solution of sodium aluminate, treating the solution with carbon dioxide, drawn from the tower, to precipitate the alumina and form sodium carbonate in solution.

2. The process according to claim 1, in which the highly concentrated solution containing aluminium sulphate is obtained by leaching the briquettes after being withdrawn from the tower, with hot water and sulphuric acid to ensure the dissolution of dehydrated or basic sulphate of aluminium.

In witness whereof I have hereunto set my hand.

NOAH JOSEPH GAREAU,
*Administrator of Lucius Richard Keogh, Deceased.*